United States Patent [19]

Jackson et al.

[11] Patent Number: 5,715,391
[45] Date of Patent: Feb. 3, 1998

[54] MODULAR AND INFINITELY EXTENDABLE THREE DIMENSIONAL TORUS PACKAGING SCHEME FOR PARALLEL PROCESSING

[75] Inventors: Rory Dana Jackson, Eastchester; Arthur Joseph Hoane, Jr., Ossining, both of N.Y.

[73] Assignee: International Business Machines Corporation, Armonk, N.Y.

[21] Appl. No.: 793,064

[22] Filed: Nov. 15, 1991

[51] Int. Cl.⁶ .................................................. G06F 15/16
[52] U.S. Cl. .............................. 395/200.01; 395/280
[58] Field of Search ................... 364/200; 395/800, 395/280, 200.01

[56] References Cited

U.S. PATENT DOCUMENTS

| | | |
|---|---|---|
| 4,247,892 | 1/1981 | Lawrence . |
| 4,546,428 | 10/1985 | Morton . |
| 4,591,980 | 5/1986 | Huberman et al. . |
| 4,598,400 | 7/1986 | Hillis .................................. 370/60 |
| 4,790,026 | 12/1988 | Gennery et al. . |
| 4,807,183 | 2/1989 | Kung et al. . |
| 4,814,973 | 3/1989 | Hillis . |
| 4,891,751 | 1/1990 | Call et al. . |
| 4,933,836 | 6/1990 | Tulpule et al. . |
| 4,942,517 | 7/1990 | Cok . |
| 4,985,832 | 1/1991 | Grondalski . |
| 5,072,371 | 12/1991 | Benner et al. ......................... 395/200 |
| 5,109,353 | 4/1992 | Sample et al. ......................... 364/578 |
| 5,130,992 | 7/1992 | Frey, Jr. et al. ....................... 371/401 |
| 5,134,690 | 7/1992 | Samatham ............................. 395/200 |
| 5,175,733 | 12/1992 | Nugent ................................. 370/94.3 |
| 5,181,017 | 1/1993 | Frey, Jr. et al. ..................... 340/825.25 |
| 5,247,694 | 9/1993 | Dahl .................................... 395/800 |

OTHER PUBLICATIONS

Generalized Hupercube and Hyperbus Structures for a Computer Network. By Laxmi N. Bhuyan and Dharma P. Agrawal, IEEE publication 1984, vol. C-33 #1. pp. 323-333.

*Primary Examiner*—Parshotam S. Lall
*Assistant Examiner*—Zarni Maung
*Attorney, Agent, or Firm*—Richard M. Ludwin, Esq.; Sterne, Kessler, Goldstein & Fox P.L.L.C.

[57] ABSTRACT

A parallel processing computer having a three dimensional (3D) torus topology. The computer includes multiple nodes formed in rows, multiple leap frog connections, and multiple end connections. The rows extend into the X, Y, and Z dimensions. The 3D torus topology of the present invention is achieved as follows. Along every row, end nodes are connected to adjacent nodes by the end connections. Also, along every row, alternate nodes are connected by the leap frog connections. Thus, the use of the leap frog connections results in an alternating connection pattern among the nodes.

22 Claims, 14 Drawing Sheets

THREE DIMENSIONAL NETWORK TOPOLOGY 501

Z DIMENSION CONNECTION

5,715,391

MODULAR AND INFINITELY EXTENDABLE THREE DIMENSIONAL TORUS PACKAGING SCHEME FOR PARALLEL PROCESSING

BACKGROUND OF THE INVENTION

1. Technical Field

The present invention relates generally to tightly coupled parallel processing machines, and more particularly to network topologies for tightly coupled parallel processing machines.

2. Background Art

Future engineers and scientists will require computers having much greater processing power than computers which exist today. Tightly coupled parallel processing machines have the potential for providing such processing power. However, to achieve this processing power, an efficient, high performance internal communication network (that is, a network topology or structure) is required which will enable a large number of processors to cooperate in solving complex problems.

One network topology that has attracted some interest is the multi-stage shuffle network, which is described in "A Survey of Interconnection Networks" by Tse-yun Feng (*Computer*, December 1981, pages 12–27). FIG. 1 illustrates a variation of the multi-stage shuffle network 102. The shuffle network 102 includes processors 104 and 4×4 switch nodes 106. The processors 104 communicate via the switch nodes 106.

The shuffle network 102 is advantageous because communication between any two ports 104 never exceeds log (base D of N) communication node traversals, where N is the number of processors 104 and D is the dimension of the switch nodes 106.

The shuffle network 102 is flawed, however, because it is difficult to partition for packaging. This is due to the complex connections between switch nodes 106 (see, for example, the connections between the switch nodes 106B and 106C). Consequently, shuffle networks 102 are difficult and expensive to expand.

Another network topology that has been used is an X-Y matrix or mesh network. FIG. 2 illustrates a two-dimensional (2D) mesh network 202 having 16 nodes 204. The nodes 204 are connected via communication links 206.

The 2D mesh network 202 is advantageous because the communication links 206 are only between adjacent nodes 204. This connection pattern easily partitions for packaging.

The 2D mesh network 202 is flawed, however, because a widely varying number of communication links 206 must be traversed between different sets of nodes 204. In particular, with the 2D mesh network 202, certain combinations of nodes 204 require a greater number of communication link traversals by comparison to the multi-stage shuffle network 102 of similar size.

An extension to the mesh network that yields a significant reduction in worst case communication path lengths is a mesh network having horizontal and vertical wrap-around connections. Topologies having wrap-around connections are called torus topologies due to their appearance.

FIG. 3 illustrates a 2D torus network 302. The 2D torus network 302 includes nodes 304 which are linked via communication links 306 and wrap-around connections 308. The wrap-around connections 308 are physically longer than the communication links 306. This may not be a problem for small meshes. Large meshes, however, are necessary for achieving high processing power. In large meshes, the end wrap forces a more conservative link control design. Consequently, the end node designs are different from the internal nodes. Alternatively, the conservative design is applied to all nodes. Another alternative is to slow all of the links down to match the end wrap link. Thus, there is additional cost and/or reduced performance. In any case, messages traversing the end wrap experience relatively greater delays.

Also, the 2D torus network 302 is flawed because it is difficult to partition for packaging due to the wrap-around connections 308.

The 2D torus network 302 may be improved by constructing a three-dimensional X-Y-Z mesh network having a wrap-around connection in the Z dimension. Such 3D torus networks offer reduced average and worst case communication path lengths over 2D torus networks of the same size. However, conventional 3D torus networks suffer from the same flaws as the 2D torus network 302.

As indicated above, mesh topologies are superior to shuffle topologies in cases where near neighbor communications dominate. During these cases, a large portion of the nodes in a mesh network can be reached in less than or equal to log(base D of N) link traversals. Conversely, node to node communication in shuffle networks can never be less than log(base D of N) link traversals.

Additionally, mesh connected structures are inherently fault tolerant since there are typically multiple routes between nodes. In shuffle structures, fault tolerance is achieved only by adding one or more redundant switching stages.

The J-Machine and the processing array experiment (PAX) computer are recent research machines which explore the mesh connection structure.

The J-Machine is decribed in *The J-Machine: A Fine-Grain Concurrent Computer* by Dally et al. The J-Machine is designed as a two-dimensional mesh. The J-Machine, however, is extendable to three dimensions. The J-Machine has unwrapped ends. Thus, the J-Machine is similar to the 2D mesh network 202 shown in FIG. 2. Like the 2D mesh network 202, the J-Machine is relatively easy to partition and expand. However, also like the 2D mesh network 202, the J-Machine does not feature the performance gain resulting from wrap-around connections.

The PAX topology is described in *PAX Computer* by Tsutomu Hoshino (Addison-Wesley Publishing Company, Reading, Mass., 1989). The PAX network topology addresses the problems of the 2D torus network 302.

FIG. 4 illustrates a PAX topology 402. The PAX topology 402 uses communication links 406 and wrap-around connections 408 to connect nodes 404.

The PAX topology 402 implements a torus topology in a two-dimensional form using a physical configuration which brings the wrap-around nodes (that is, the nodes 404 connected by the wrap-around connections 408) close together. Consequently, long wrap-around connections 408 are avoided. Note that the PAX topology 402 is two dimensional since the processors 404 have connections in only two dimensions (that is, the X and Y dimensions).

As shown in FIG. 4, the PAX topology 402 includes back-to-back boards arranged in a circle. Thus, the PAX topology 402 is readily extendable to larger two-dimensional machines. However, the PAX topology 402 would require unacceptably long wrap-around connections 408 if it were to be extended to a three-dimensional topology. Additionally, expanding an existing machine having a PAX topology would require more reconfiguration than expanding an open ended mesh network such as the J-machine.

Thus, a network topology that can be easily partitioned for packaging, that has inherent redundancy, that easily scales to larger sizes with linear growth in required hardware, and that reduces worst case communication path lengths is required. The conventional topologies described above do not offer all of these features.

DISCLOSURE OF THE INVENTION

The present invention is directed to a parallel processing computer having a three dimensional (3D) torus topology. More broadly, the present invention is directed to a 3D torus topology for use with parallel processing computers.

The computer of the present invention includes multiple nodes formed in rows, multiple leap frog connections, and multiple end connections. The rows extend into the X, Y, and Z dimensions.

The 3D torus topology of the present invention is achieved as follows. Along every row, end nodes are connected to adjacent nodes by the end connections. Also, along every row, alternate nodes are connected by the leap frog connections. Thus, the use of the leap frog connections results in an alternating connection pattern among the nodes.

Each node includes a switch, leapfrog paths in the X, Y, and Z dimensions, minus paths in the X, Y, and Z dimensions, and plus paths in the X, Y, and Z dimensions. In this patent document, "minus" and "plus" designate sides of the nodes. In the X dimension, for example, minus and plus may refer to the left and right sides, respectively, of the nodes.

The minus paths and plus paths are all coupled to the switch. Each node also includes a bus coupled to the switch, a processor coupled to the bus, and a memory coupled to the bus.

The leap frog connections are formed by a connection of a plus path in a first node, a leapfrog path in a second node, and a minus path in a third node, wherein the first and third nodes are adjacent to the second node. The end connections are formed by an end wrap which connects a node's minus or plus path on one of the node's sides to the node's leap frog path on the same side. Data is directed through a node as follows. The switch of a node receives data from one of the minus or plus paths. The switch determines whether the data is intended for the node's local processor. If the data is intended for the node's local processor, then the switch directs the data to the local processor. Otherwise, the switch forwards the data to another node by sending the data on one of the minus or plus paths in any of the three dimensions X, Y, or Z.

FEATURES AND ADVANTAGES OF THE PRESENT INVENTION

The present invention includes the following features and advantages.

First, according to the present invention, a three-dimensional torus network may be constructed from a simple three-dimensional physical matrix arrangement of nodes.

Second, the present invention permits the three-dimensional torus network to be accomplished with link lengths that are all close to 2P, where P is the periodic distance between adjacent nodes in a matrix arrangement. In other words, the torus network of the present invention is not accomplished using a majority of links (that is, links between adjacent nodes) of P length and a minority of links (that is, links which span the length of the entire machine) of (cube root of N)×P length, where N is the number of nodes in the matrix. This results in the following advantages.

First, a uniform link delay is provided for all links, thereby simplifying communication protocol.

Second, a more uniform link length is provided for all links, thereby permitting implementation with few interconnection component types.

Third, a more uniform link electrical transmission characteristic is provided for all links, thereby simplifying the design of signaling electronics. The foregoing and other objects, features and advantages of the invention will be apparent from the following more particular description of preferred embodiments of the invention, as illustrated in the accompanying drawings.

BRIEF DESCRIPTION OF THE DRAWINGS

The present invention will be described with reference to the accompanying drawings, wherein.

DETAILED DESCRIPTION OF THE PREFERRED EMBODIMENTS

Figure 1:
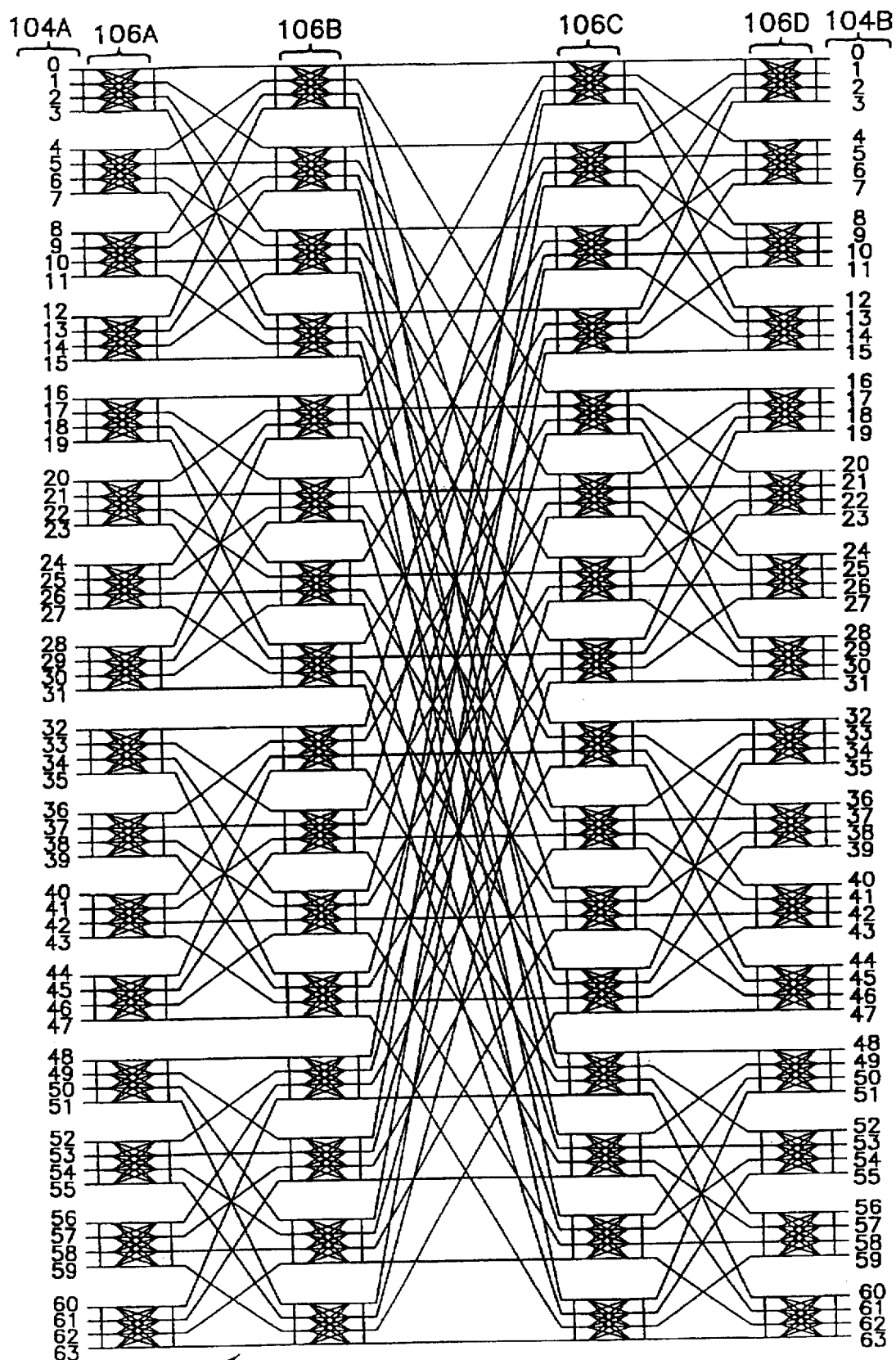
FIG. 1 illustrates a multi-stage shuffle network.
Figure 2:
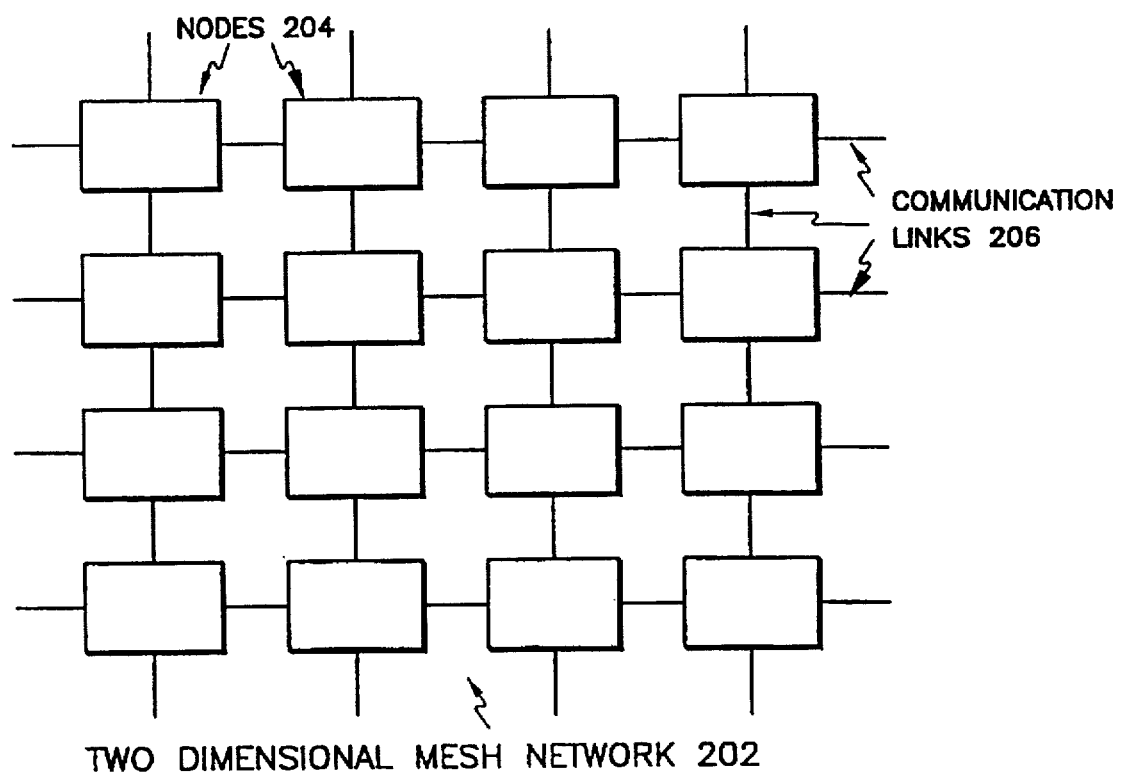
FIG. 2 illustrates a two-dimensional (2D) mesh network.
Figure 3:
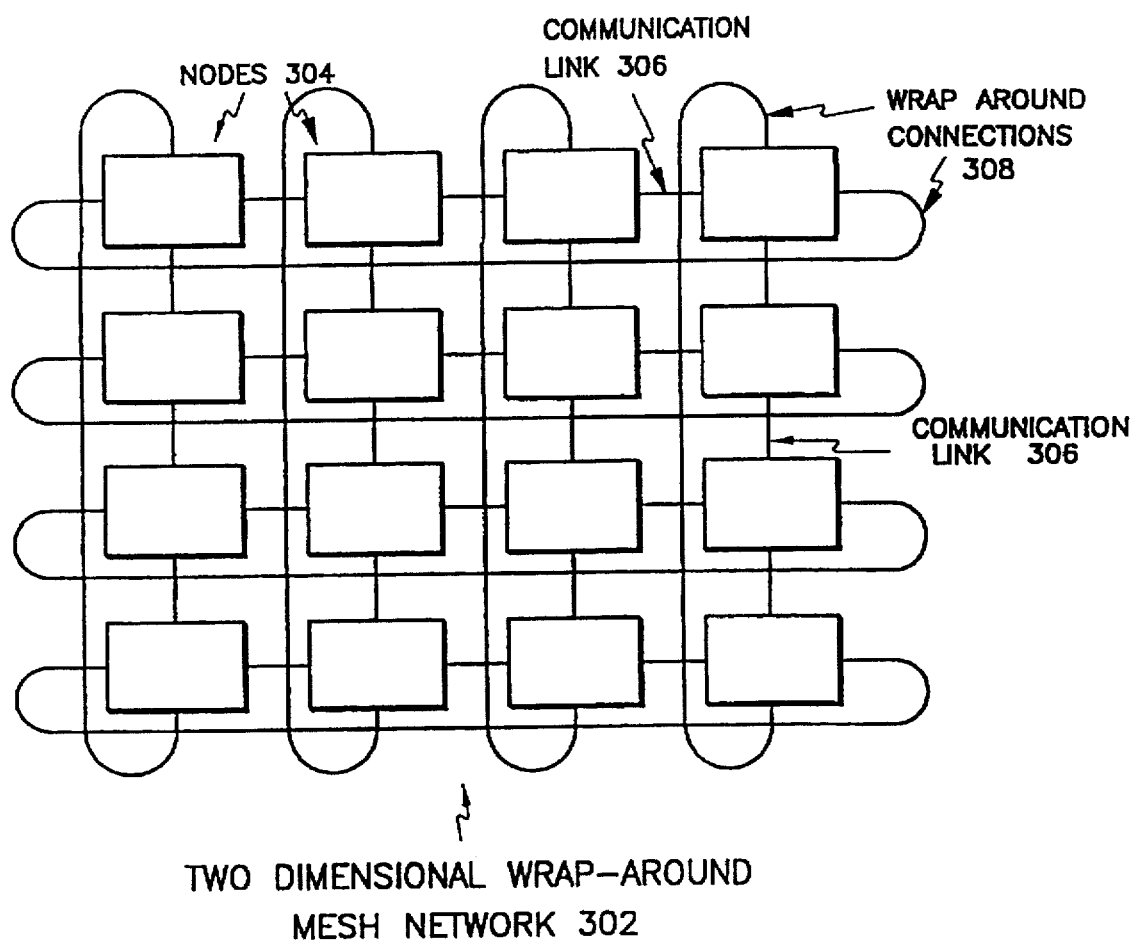
FIG. 3 illustrates a 2D torus network.
Figure 4:
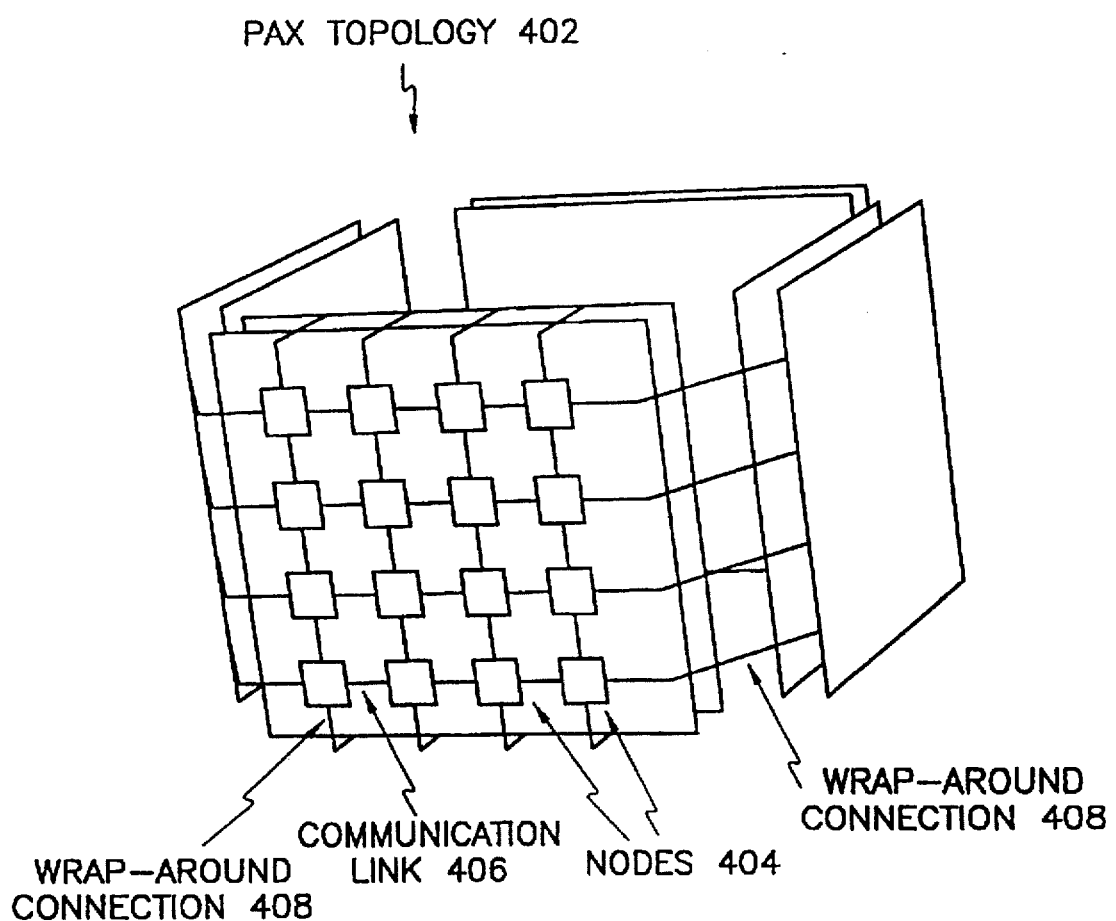
FIG. 4 illustrates a PAX topology.
Figure 5A:
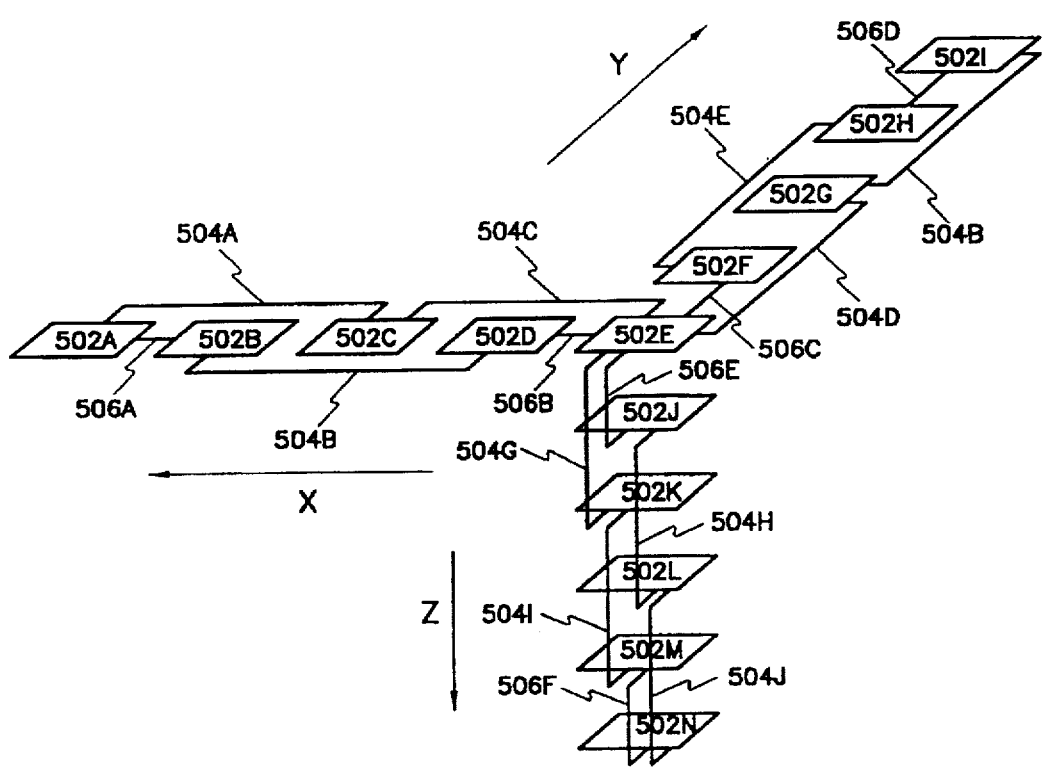
FIG. 5A illustrates a three dimensional (3D) torus network topology according to the present invention.

FIG. 5A illustrates a three dimensional (3D) torus network topology 501 according to the present invention. For clarity reasons, FIG. 5A shows only one row for each of the three dimensions X, Y, and Z. The remaining rows in the three dimensions are similarly connected as shown in FIG. 5A.

While FIG. 5A illustrates a topology having linear rows (that is, rows having elements which are formed in a straight line), the present invention applies to topologies having non-linear rows.

The topology 501 of the present invention includes nodes 502, leap frog connections 504, and end connections 506. The nodes 502 are connected via the leap frog connections 504 and end connections 506.

Specifically, along every row, the end nodes (such as node 502A) are connected to their immediately adjacent nodes (such as node 502B) by the end connections (such as end connection 506A). Also, along every row, every node is connected to every other node by the leap frog connections 504. In other words, the leap frog connections 504 couple alternating nodes. For example, node 502G is connected to nodes 502E and 502I via the leap frog connections 504D and 504F, respectively. Thus, nodes 502G and 502E are alternating nodes. Similarly, nodes 502G and 502I are alternating nodes.

As another example, node 502M is connected to node 502K via the leap frog connection 504L. Node 502M is also connected to node 502N via the end connection 506F. Thus, nodes 502M and 502K are alternating nodes. Nodes 502M and 502N are not alternating nodes.

Thus, the use of the leap frog connections 504 as described above results in an alternating connection pattern among the nodes 502.

The present invention achieves a torus topology without using conventional wrap-around connections 308. The "ring connection" which conventional mesh networks 302 achieve using wrap-around connections 308 is achieved, in the present invention, via the alternating connection pattern.

Figure 5B:
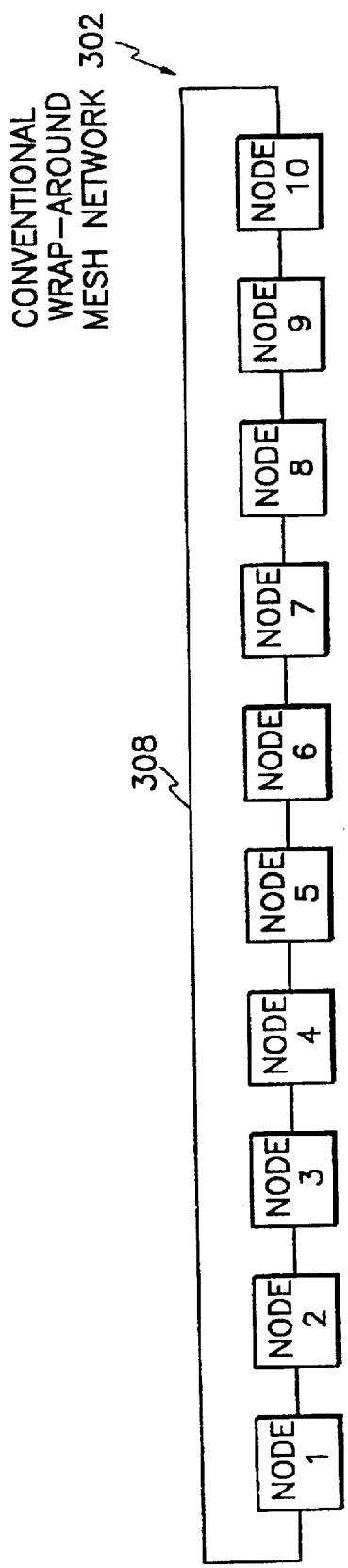
FIG. 5B illustrates one row of a conventional wrap-around mesh network.
Figure 5C:
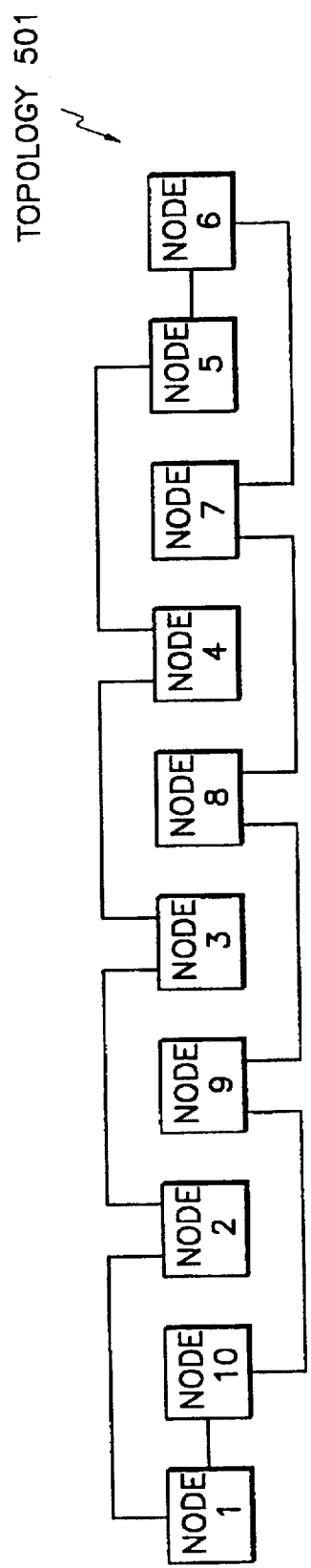
FIG. 5C illustrates one row of the torus topology of the present invention.

For example, consider FIGS. 5B and 5C. FIG. 5B illustrates one row of the conventional wrap-around mesh network 302. FIG. 5C illustrates one row of the torus topology 501 of the present invention. Both the conventional mesh network 302 and the torus topology 501 include 10 nodes. As evident from FIGS. 5B and 5C, the link distances between any two nodes are similar for both the conventional mesh network 302 and the torus topology 501. The torus topology 501, however, does not use a conventional wrap-around connection 308. Thus, the torus topology 501 avoids the problems of the conventional mesh network 302.

For systems with 64 or greater nodes 502, the manner in which the nodes 502 in rows are connected may be precisely determined as follows. First, number all the nodes 502 in a row in a physically sequential manner. Second, connect the even nodes (that is, 2i to 2(i+1)) using leap frog connections 504. Third, connect the odd nodes (that is, 2i+1 to 2(i+1)+1) using leap frog connections 504. Fourth, connect node 0 to node 1 and node 2(I+1) to 2(I+1)+1 using end connections 506. In the above, the variable i ranges from 0 to I, where I=((cube root of N)/2)-2. N is the number of nodes 502.

As apparent from FIGS. 5A and 5C, all communication links in the topology 501 of the present invention have a length of approximately twice the physical node periodicity. The physical node periodicity refers to the distance between any two adjacent nodes 502 in the same row.

Figure 6A:
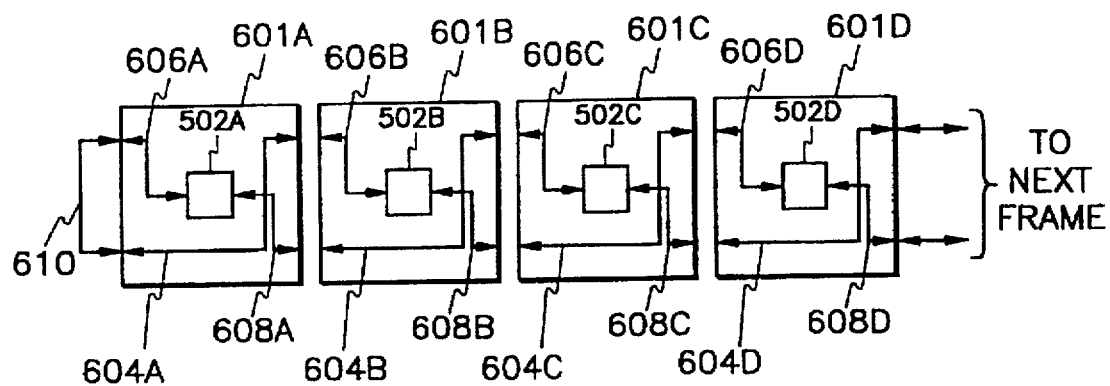
FIG. 6A illustrates a planar implementation of the topology of the present invention.

FIG. 6A illustrates a planar implementation of the topology 501 of the present invention. The planar implementation of FIG. 6A may be achieved using printed circuit boards (PCB) 601. For clarity reasons, FIG. 6A shows only one row. Additionally, FIG. 6A shows connections in only the X dimension. Connections in other rows and in the Y and Z dimensions can be made in a fashion similar to that shown in FIG. 6A and described below.

Each of the boards 601 includes a node 502. Each of the boards 601 also includes a leap frog path 604, a minus path 606, and a plus path 608. The leap frog path 604, minus path 606, and plus path 608 are all bi-directional.

The leap frog path 604 bypasses the node 502. The leap frog path 604 merely passes through the board 601 from one end to the other end.

The combination of the minus path 606 and plus path 608 forms a communication link which passes through the node 502. Consider node 502B. Data received by the node 502B from its minus path 606B may be captured and processed by the node 502B. Alternatively, the node 502B may send the data to another node 502 via its minus or plus paths in any of the three dimensions X, Y, and Z.

Consider the boards 601A, 601B, and 601C. The combination of the plus path 608A, the leap frog path 604B, and the minus path 606C forms a leap frog connection 504. Thus, data sent from the node 502A bypasses the node 502B and arrives at the node 502C. An end connection 506 is formed when an end wrap 610 connects a leap frog path 604 on one board 601 to either a minus path 606 or a plus path 608 on the same board 601 (and in the same dimension). This is illustrated with boards 601A and 601B, wherein the end wrap 610 connects minus path 606A and leap frog path 604A, thereby forming a communication link between adjacent nodes 502A and 502B.

Each of the boards 601 achieves position reversal. Position reversal is achieved via the positioning of the leap frog path 604, minus path 606, and plus path 608 in each of the boards 601. Consider boards 601A, 601B, and 601C. According to the present invention, the minus path 606B of the board 601B aligns with the leap frog path 604A of the board 601A. Also, the plus path 608B of the board 601B aligns with the leap frog path 604C of the board 601C. Consequently, the boards 601A, 601B, and 601C may be connected directly. Thus, the position reversal of the present invention greatly reduces wiring requirements.

Figure 6B:
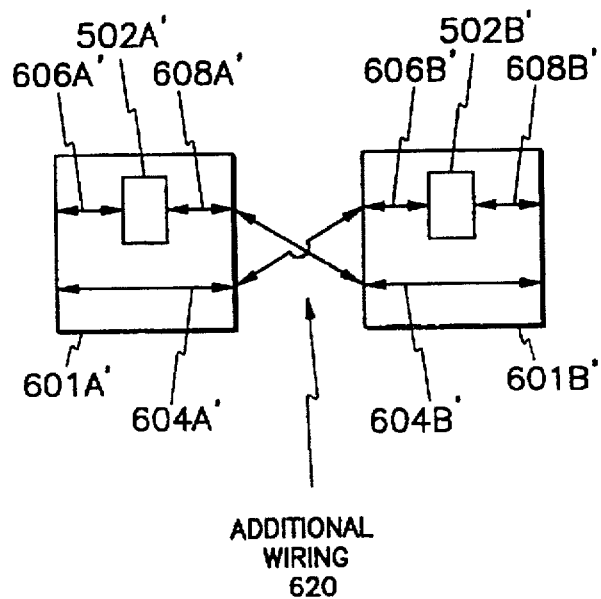
FIG. 6B illustrates an alternative planar implementation of the topology of the present invention.

FIG. 6B illustrates an alternative planar implementation of the topology 501 of the present invention. The alternative planar implementation of FIG. 6B does not achieve position reversal. As shown in FIG. 6B, additional wiring 620 is necessary when the alternative planar implementation is used.

As noted above, one type of planar board 601 can implement the connection pattern of the present invention for the X, Y and Z dimensions. All that is required is for the boards 601 to be arranged in a physically three-dimensional matrix configuration and for them to be connected to their X, Y and Z plus and minus adjacent neighbors. At the end nodes of the physical network (that is, at the top, bottom, and four sides), only simple end wraps 610 are needed to complete the torus topology.

Figure 7:
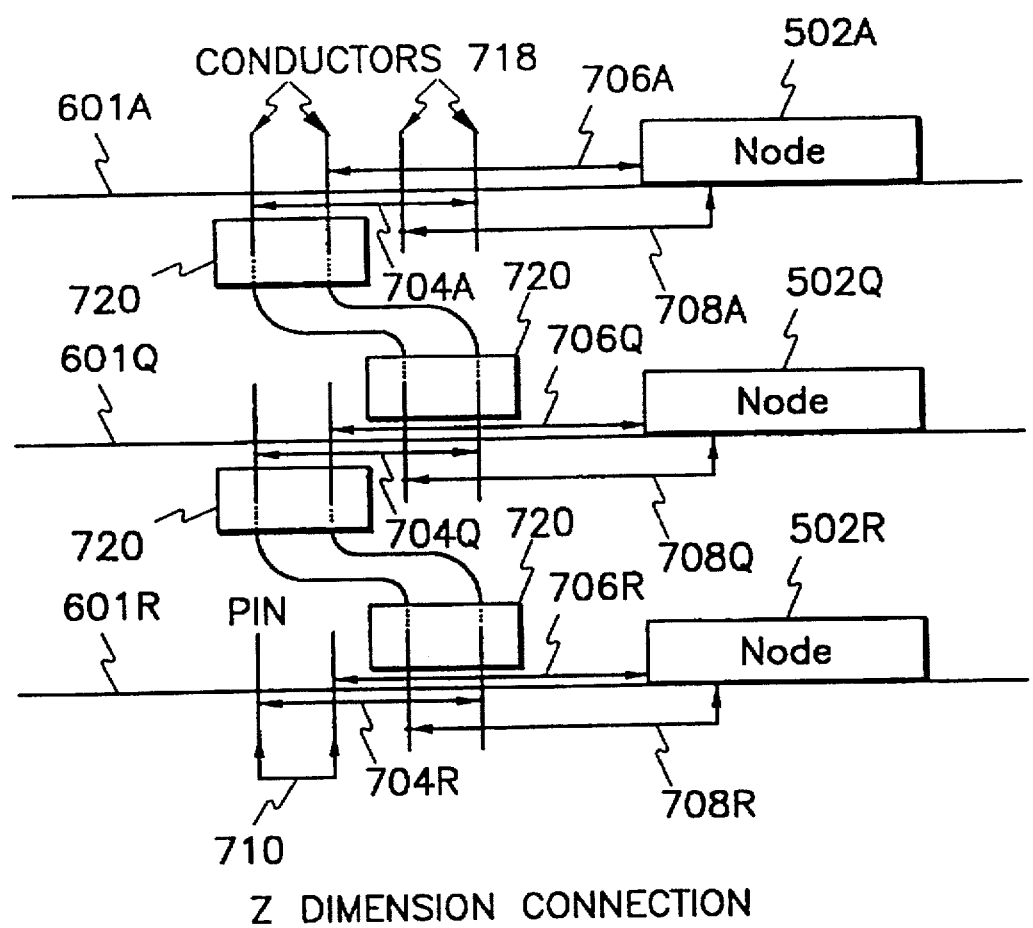
FIG. 7 illustrates connections in the third dimension of the planar implementation of the topology of the present invention.

As implied in the preceding paragraph, connections for two of the three dimensions in the network (that is, the X and Y dimensions) can be achieved in the horizontal plane. According to the present invention, the planes (that is, the boards 601) are stacked vertically to achieve connections in the third dimension of the network (that is, the Z dimension). FIG. 7 illustrates these connections in the third dimension.

As noted above, each board 601 contains a node 502. Each board 601 also contains conductors 718, connectors 720, a Z leap frog path 704, a Z minus path 706, and a Z plus path 708.

The combination of the minus path 706A, the leap frog path 704Q, and the plus path 708R forms a leap frog connection 504 between nodes 502A and 502R. Thus, data sent from the node 502A bypasses the node 502Q and arrives at the node 502R.

An end connection 506 is formed when a Z end wrap 710 connects a Z leap frog path 704 to either a Z minus path 706 or a Z plus path 708. This is illustrated with boards 601Q and 601R, wherein the Z end wrap 710 connects Z minus path 706R and Z leap frog path 704R, thereby forming a communication link between adjacent nodes 502Q and 502R.

Figure 8:
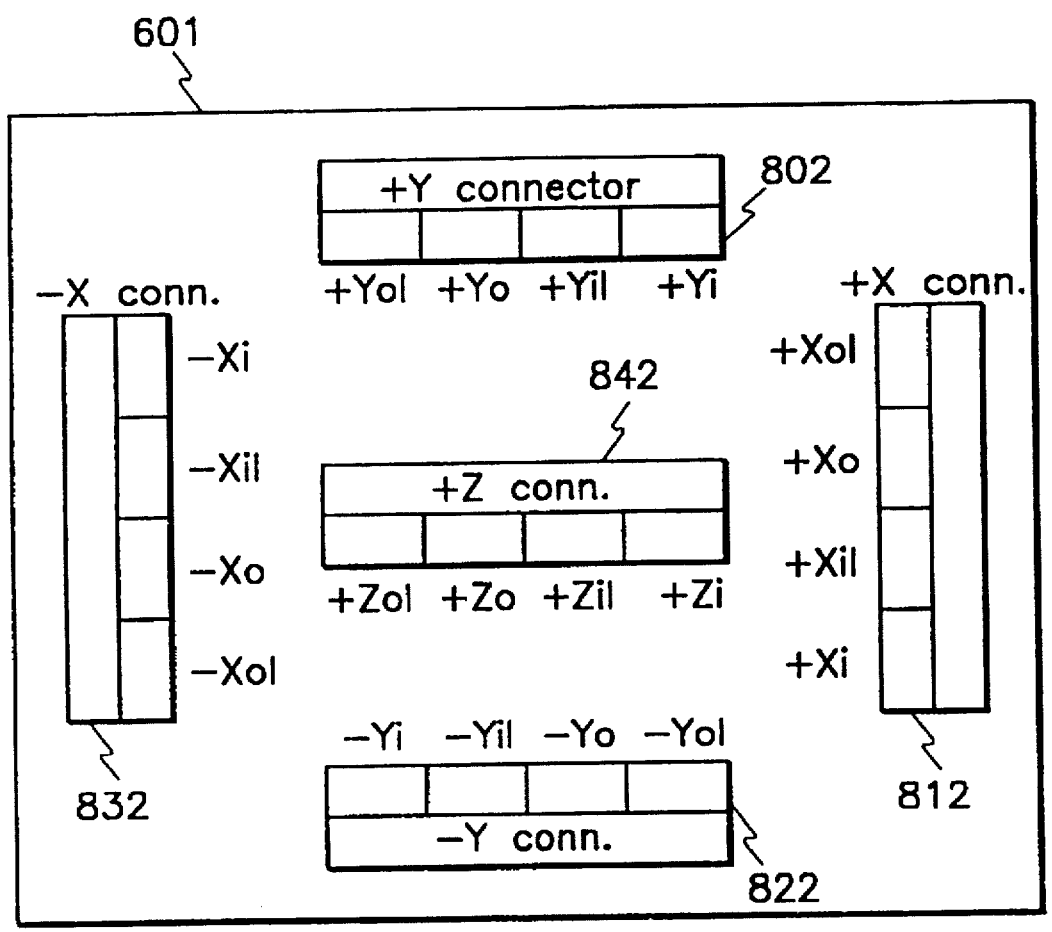
FIG. 8 illustrates a component array for printed circuit boards of the present invention.

FIG. 8 illustrates a component array for each of the boards 601. Each of the boards 601 contains a +X connector 812, a –X connector 832, a +Y connector 802, a –Y connector 822, a +Z connector 842, and a –Z connector (not shown in FIG. 8).

Figure 9:
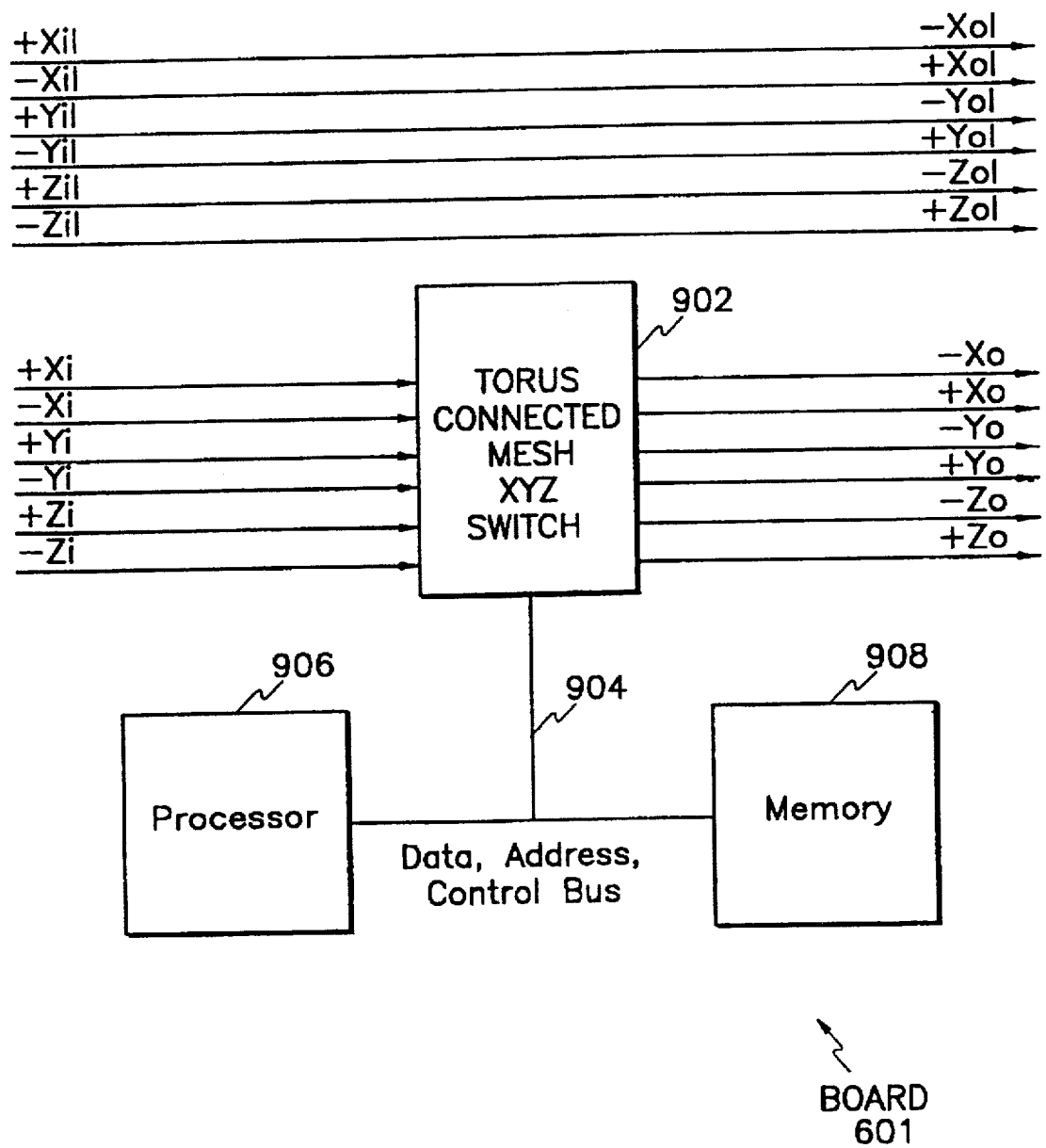
FIG. 9 illustrates a wiring diagram for each of the boards of the present invention.

According to the present invention, the boards 601 are closely aligned in an XYZ matrix arrangement so that their connectors line up for direct connection. FIG. 8 shows the top of the board 601. The +Z connector 842 is shown on the top (that is, the component side) of the board 601 where it would be surface mounted. The –Z connector is not shown since it is to be surface mounted to the bottom (that is, the wiring side) of the board 601. This facilitates board-to-board connection in the Z dimension. FIG. 8 does not show other node elements such as processor, memory, and cache. These other elements are well known. FIG. 9 illustrates a wiring diagram for each of the boards 601. As shown in FIG. 9, each of the boards 601 includes a switch 902, a bus 904, a processor 906, and a memory 908.

In both FIGS. 8 and 9, signals are named according to (1) whether they are inputs (i) or outputs (o) to the board 601, (2) their dimension (X, Y, or Z), (3) which side of the board they leave or arrive at (+ or –), and (4) whether they are a leap frog connection (l).

The output signals from the switch 902 are –Xo, +Xo, –Yo, Yo, –Zo, and +Zo. The output signals are contained in the minus paths 606 and plus paths 608. In the X dimension, for example, –Xo is contained in the minus path 606 and +Xo is contained in the plus path 608.

The output signals connect to the adjacent boards 601 as input leapfrog signals (that is, +Xil, –Xil, +Yil, –Yil, Zil, –Zil). The input leapfrog signals are contained in the leapfrog path 604. The input leapfrog signals are sent off the board 601 via the output leapfrog signals (that is, –Xol, +Xol, –Yol, +Yol, –Zol, +Zol). The output leapfrog signals are also contained in the leapfrog path 604.

As shown in FIG. 6, the output leapfrog signals connect to the adjacent boards 601 as input signals (that is, +Xi, –Xi, +Yi, –Yi, +Zi, –Zi). The input signals are contained in the minus paths 606 and plus paths 608. In the X dimension, for example, –Xi is contained in the minus path 606 and +Xi is contained in the plus path 608. This illustrates the bi-directional nature of the minus paths 606, plus paths 608, and leapfrog path 604.

For example, consider board position X=4, Y=7, Z=3 (where boards are sequentially numbered in all dimensions starting from the origin) and board position X=5, Y=7, Z=3. These boards are referred to herein as board(473) and board(573), respectively. Referring to FIGS. 8 and 9, board (473) wires +Xol, +Xo, +Xil, and +Xi connect to board(573) wires –Xi, –Xil, –Xo, and –Xol, respectively. This further illustrates the bi-directional nature of the minus path 606, plus path 608, and leapfrog path 604.

Each of the above signals could represent single bit serial channels or multiwire interfaces with separate data and control wires.

The torus connected XYZ switch element 902 routes messages and/or data streams from source to destination. The switch 902 changes the path of data between the X, Y, and Z dimensions according to the routing information carried in the message and/or resident in the switch element 902. In addition, the switch element 902 (where appropriate) routes these messages and/or data streams to the local processor 906 and/or memory elements 908. Also, the switch element 902 accepts new data from the processor 906 and/or memory elements 908 for transmission to other nodes 502. The switch element 902 performs the above using packet switching techniques.

Figure 10:
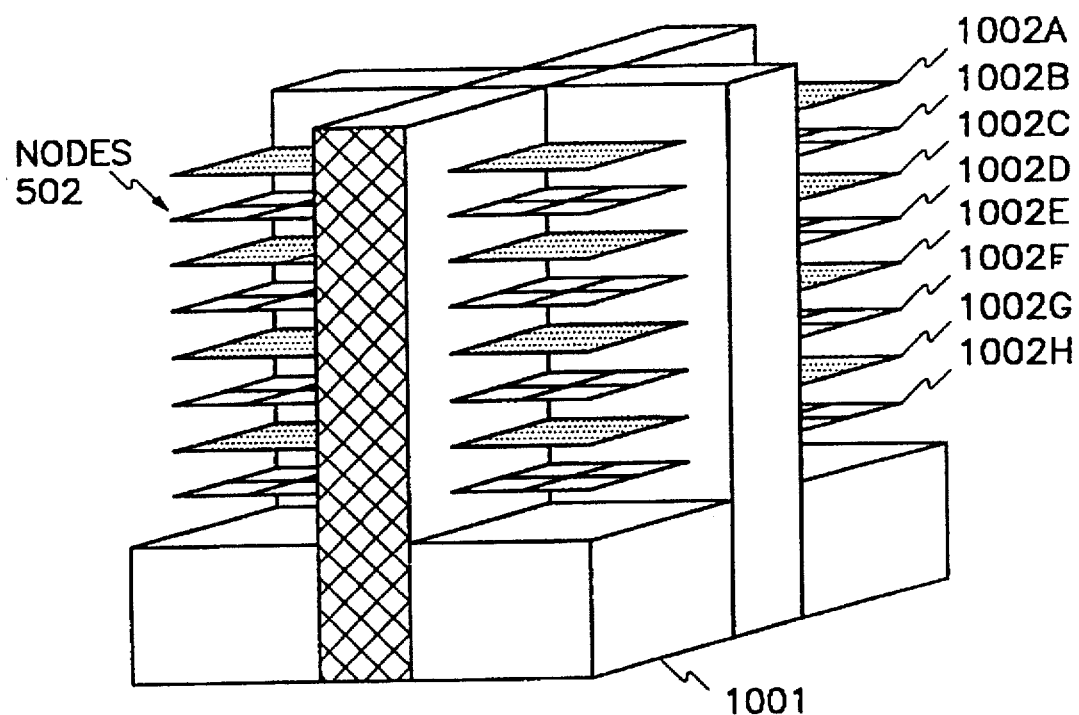
FIG. 10 illustrates a frame according to the present invention.

FIG. 10 illustrates a frame 1001. Planes 1002 having multiple nodes 502 may be stacked into the frame 1001. In FIG. 10, for example, 8 planes 1002 having 16 nodes 502 each are stacked into the frame 1001.

Spacing between the planes 1002 allows access to interior horizontal and vertical dimension connections. The number of discrete interconnection components and physical spacing periodicity of the nodes 502 may be reduced by the use of tools to make connections and/or by combining two or more nodes 502 into modular internally preconnected units.

The frame 1001 may contain the Z dimension connections between the planes 1002. This would maximize access between the planes 1002. Alternatively, the Z dimension connections may be positioned between the planes 1002 (and outside the frame 1001).

Figure 11:
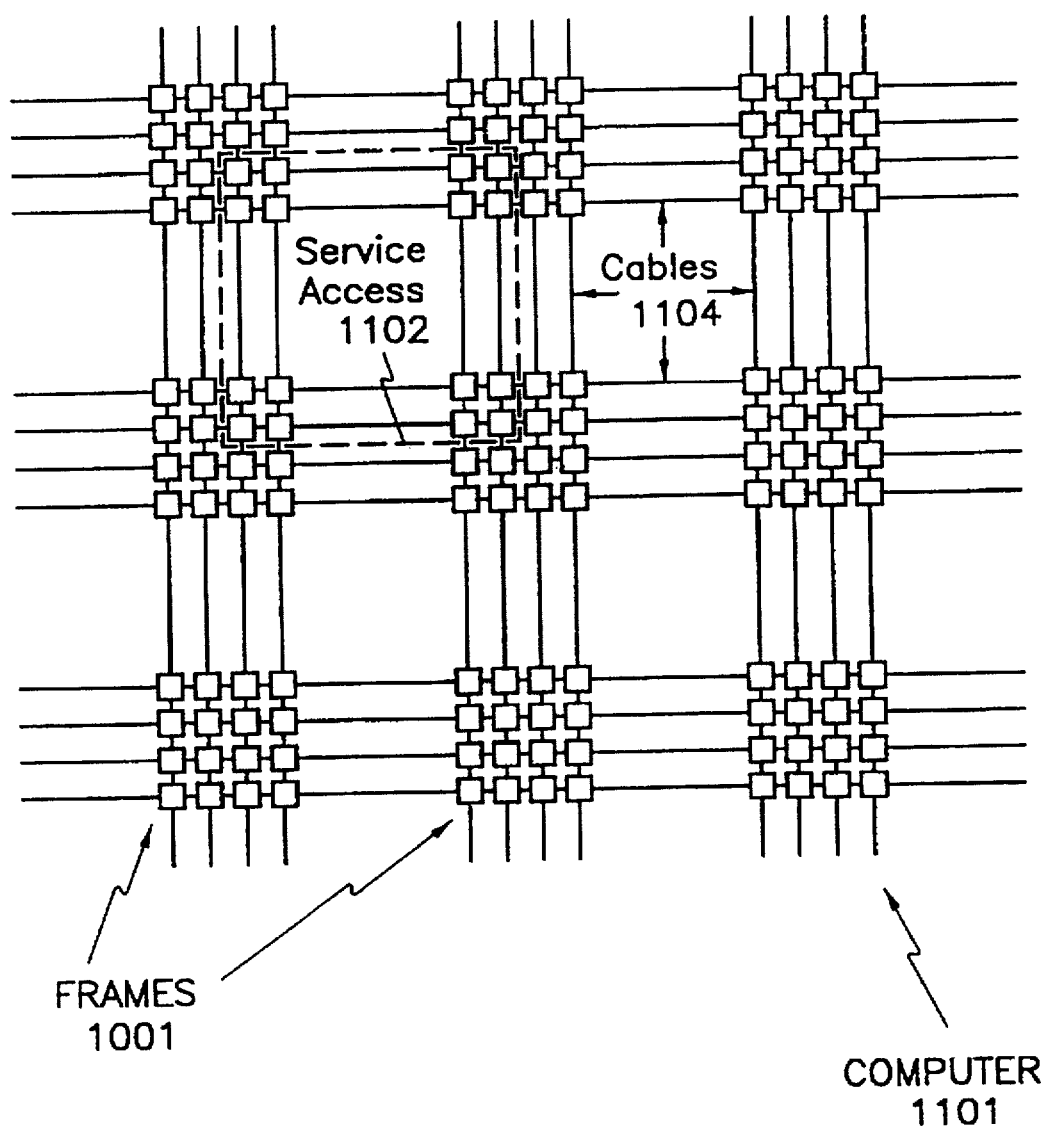
FIG. 11 illustrates a top view of a parallel processing computer according to the present invention.
Figure 12:
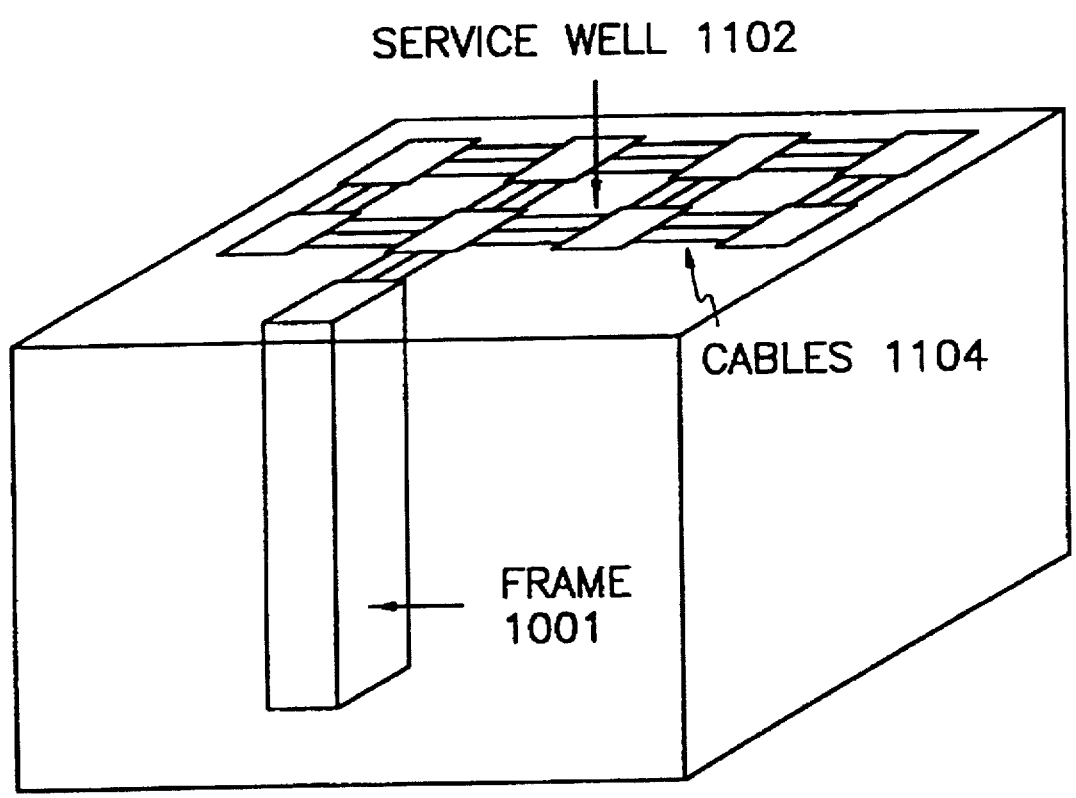
FIG. 12 illustrates a perspective view of the computer of the present invention.

FIG. 11 illustrates a top view of a parallel processing computer 1101 according to the present invention. FIG. 12 illustrates a perspective view of the same computer 1101. The computer 1101 contains multiple frames 1001. Note that interconnections 1104 are always between adjacent neighboring frames 1001.

Also note that, in the example of FIGS. 11 and 12, the frames 1001 are spaced apart, thereby giving practical consideration to serviceability. Because of the connection pattern of the present invention, the spacing of the frames 1001 causes service access spaces 1102 to open up at very useful locations. The accessibility provided by the service spaces 1102 and from the perimeter area allows complete coverage for servicing all of the nodes 502.

The spacing between frames 1001 introduces some undesirable increase in path length between nodes 502. However, this small amount is tolerable. Conversely, wires spanning the entire width of the configuration to complete the torus wrap (as with conventional topologies) are intolerable.

Large parallel processing computers having the three dimensional torus topology of the present invention may be implemented using known printed circuit board technology. For example, by using the topology of the present invention, a 64-node machine in a 4×4×4 arrangement could be easily contained in a single short frame 1001.

A 512 node machine would require only 4 frames 1001, each having 8 planes 1002 of 16 nodes 502 each. Spacing the planes 1002 at 5 inches and adding 24 inches for integral supplies (such as power and cooling) yields an eight-level frame 1001 of approximately 64 inches.

The topology of the present invention may be used to implement even larger machines having short node-to-node communication links. For example, with a modest vertical plant average periodicity of 3 inches, a vertical Z dimension of 32 planes 1002 may be constructed in an eight foot high frame 1001 (note that additional raised floor and drop ceiling space may be needed for power and cooling requirements, and to gain access to the service areas 1102). 64 frames 1001 in an 8×8 configuration is possible if the horizontal plane is allowed to match the Z dimension. This yields a 32×32×32 three-dimensional torus with 32,768 nodes 1002. Such a configuration might occupy a 46 foot square area.

Considering the number of nodes 502 in this machine configuration, the amount of volume used is relatively low.

Additionally, this volume is efficiently used since all of the nodes 1002 and cables 1104 are accessible. Further, even with this volume, all of the node-to-node communication links would be less than 4 feet.

In the parallel processing computer 1101 of the present invention, each of the nodes 502 may contain the following elements: a processor, memory, input/output (I/O) channels (such as two 125 Mbit serial send/receive channels, I/O direct memory access (DMA) logic, switch and control logic, switch DMA logic, and symmetrical connectors.

Figure 13:
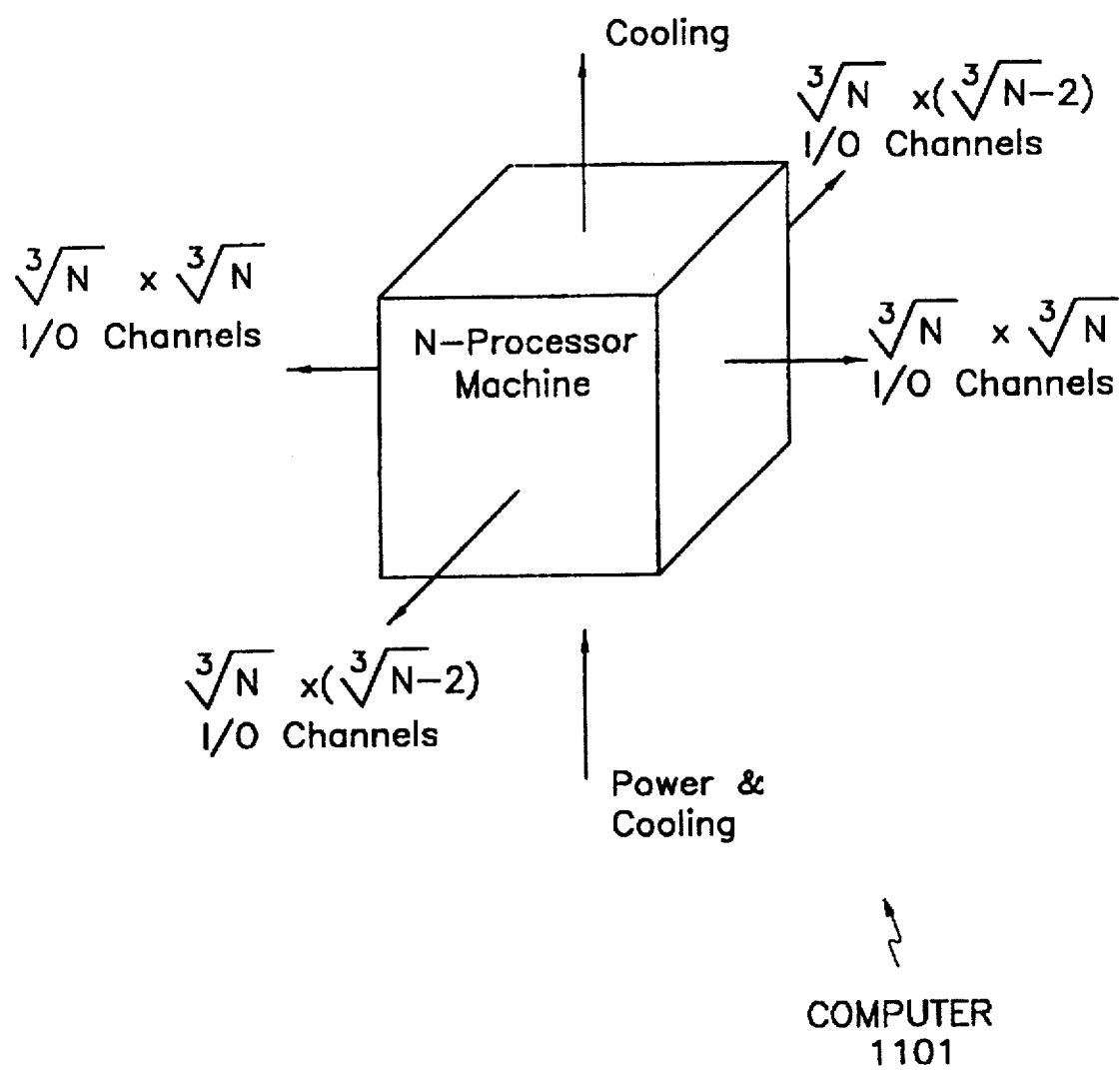
FIG. 13 illustrates a conceptual diagram of a three-dimensional torus machine of the present invention.

FIG. 13 illustrates a conceptual diagram of a three-dimensional torus machine 1101 having N nodes 502, wherein each of the nodes 502 contains the elements listed above. As shown in FIG. 13, the top and bottom planes of the machine 1101 are reserved for power, cooling, and access. Because each node 502 includes a high speed serial I/O channel, boundary nodes on all four side surfaces of the machine 1101 can serve for I/O access. FIG. 13 specifies the number of boundary nodes (and, thus, the number of I/O channels) on each of the four side surfaces.

Thus far, a planar board implementation of the three-dimensional torus network of the present invention has been described. However, other packaging media may be used to achieve the three-dimensional torus topology network of the present invention. For example, monolithic packaging media, such as wafer scale integration in three dimensions or multi-layered multi-chip carrier technology, may be used. While the invention has been particularly shown and described with reference to preferred embodiments thereof, it will be understood by those skilled in the art that various changes in form and details may be made therein without departing from the spirit and scope of the invention.

What is claimed is:

1. A communication system for enabling data transfer among nodes in a multiprocessor computer system, comprising:

multiple processor nodes arranged in rows, each of said nodes being on a respective computer board;

multiple leap frog connections for coupling alternating nodes in each of said rows; and multiple end connections for coupling end nodes to nodes adjacent to said end nodes in each of said rows;

wherein each of said leap frog connections comprises:

a leapfrog data communication path, statically formed on a first computer board also having thereon a first node, said leapfrog data communication path bypassing said first node and having a first end and a second end;

a minus data communication path, statically formed on a second computer board also having thereon a second node adjacent to said first node, having an end coupled to said leapfrog path second end and having an end coupled to said second node; and a plus data communication path, statically formed on a third computer board also having thereon a third node adjacent to said first node, having an end coupled to said leapfrog path first end and having an end coupled to said third node;

wherein said first, second, and third nodes represent three of said nodes arranged in one of said rows.

2. The system of claim 1, wherein said rows are arranged in a three-dimensional matrix.

3. The system of claim 1, wherein each of said nodes comprises a switch, and wherein a computer board on which said each of said nodes is on comprises:

a leapfrog data communication path having first and second ends and bypassing said each of said nodes;

a minus data communication path having a first end coupled to said switch and a second end; and a plus data communication path having a first end coupled to said switch and a second end.

4. The system of claim 3, wherein said minus path second end and said leapfrog path second end are positioned in a first plane and said plus path second end and said leapfrog path first end are positioned in a second plane apart from and substantially parallel to said first plane.

5. The system of claim 3, wherein each of said end connections comprises an end wrap coupling said minus path second end to said leapfrog path first end.

6. The system of claim 3, wherein each of said end connections comprises an end wrap coupling said plus path second end to said leapfrog path second end.

7. The system of claim 3, wherein each of said nodes further comprises:

a bus coupled to said switch;

a central processing unit coupled to said bus; and a memory coupled to said bus.

8. The system of claim 7, wherein said switch comprises:

means for receiving data from said minus path and plus path;

means for determining destinations of said data;

means for routing said data to said central processing unit when said destinations identify said central processing unit; and means for sending said data to nodes identified by said destinations via said minus path and plus path when said destinations identify nodes other than one containing said central processing unit.

9. The system of claim 1, wherein each of said nodes comprises a switch and a central processing unit, and wherein a computer board on which said each of said nodes is on comprises:

leapfrog data communication paths in X, Y, and Z dimensions, each of said leapfrog paths including first and second ends and bypassing said each of said nodes;

minus data communication paths in said X, Y, and Z dimensions, each of said minus paths including a first end coupled to said switch and a second end; and plus data communication paths in said X, Y, and Z dimensions, each of said plus paths including a first end coupled to said switch and a second end.

10. The system of claim 9, wherein said switch comprises:

means for receiving data from said minus path first ends;

means for determining a destination of said data;

means for routing said data to said central processing unit when said destination is said central processing unit; and means for sending said data to one or more of said plus path first ends according to said destination when said destination identifies a node other than one containing said central processing unit.

11. A three-dimensional matrix of nodes comprising one or more frames each having multiple planes, wherein each of said planes comprises:

multiple processor nodes arranged in rows, each of said nodes being on a respective computer board;

multiple leap frog connections for coupling alternating nodes in each of said rows; and multiple end connections for coupling end nodes to nodes adjacent to said end nodes in each of said rows;

wherein each of said leap frog connections comprises:

a leapfrog data communication path, statically formed on a first computer board also having thereon a first node, said leapfrog data communication path bypassing said first node and having a first end and a second end;

a minus data communication path, statically formed on a second computer board also having thereon a second node adjacent to said first node, having an end coupled to said leapfrog path second end and having an end coupled to said second node; and a plus data communication path, statically formed on a third computer board also having thereon a third node adjacent to said first node, having an end coupled to said leapfrog path first end and having an end coupled to said third node;

wherein said first, second, and third nodes represent three of said nodes arranged in one of said rows.

12. The matrix of claim 11, wherein each of said nodes comprises a switch and a central processing unit, and wherein a computer board on which said each of said nodes is on comprises:

a leapfrog data communication path having first and second ends and bypassing said each of said nodes;

a minus data communication path having a first end coupled to said switch and a second end; and a plus data communication path having a first end coupled to said switch and a second end.

13. The matrix of claim 12, wherein each of said nodes further comprises:

means for receiving data from said minus and plus paths;

means for determining destinations of said data;

means for routing said data to said central processing unit when said destinations identify said central processing unit; and means for sending said data to nodes identified by said destinations via said minus and plus paths when said destinations identify nodes other than one containing said central processing unit.

14. The matrix of claim 11, further comprising:

connection means for coupling said frames; and service wells formed between said coupled frames.

15. A multiprocessor computing system organized into a series of nodes arranged in rows, wherein each of said nodes is on a respective computer board, the system comprising:

multiple leap frog connections for coupling alternating nodes in each of said rows; and wherein each of said leap frog connections comprises:

a leapfrog data communication path, statically formed on a first computer board also having thereon a first node, said leapfrog data communication path bypassing said first node and having a first end and a second end;

a minus data communication path, statically formed on a second computer board also having thereon a second node adjacent to said first node, having an end coupled to said leapfrog path second end and having an end coupled to said second node; and a plus data communication path, statically formed on a third computer board also having thereon a third node adjacent to said first node, having an end coupled to said leapfrog path first end and having an end coupled to said third node;

wherein said first, second, and third nodes represent three of said nodes arranged in one of said rows.

16. The multiprocessor computing system of claim 15, wherein each of said nodes further comprises a switch and a central processing unit, and wherein a computer board on which said each of said nodes is on comprises:

a leapfrog data communication path having first and second ends and bypassing said each of said nodes;

a minus data communication path having a first end coupled to said switch and a second end; and a plus data communication path having a first end coupled to said switch and a second end.

17. The multiprocessor computing system of claim 16, wherein said minus path second end and said leapfrog path second end are positioned in a first plane and said plus path second end and said leapfrog path first end are positioned in a second plane apart from and substantially parallel to said first plane.

18. The multiprocessor computing system of claim 16, further comprising multiple end connections for coupling end nodes to nodes adjacent to said end nodes in each of said rows, wherein each of said end connections comprises an end wrap coupling said minus path second end to said leapfrog path first end.

19. The multiprocessor computing system of claim 16, further comprising multiple end connections for coupling end nodes to nodes adjacent to said end nodes in each of said rows, wherein each of said end connections comprises an end wrap coupling said plus path second end to said leapfrog path second end.

20. The multiprocessor computing system of claim 16, wherein said switch comprises:

means for receiving data from said minus and plus paths;

means for determining destinations of said data;

means for routing said data to said central processing unit when said destinations identify said central processing unit; and means for sending said data to nodes identified by said destinations via said minus and plus paths when said destinations identify nodes other than one containing said central processing unit.

21. The multiprocessor computing system of claim 15, wherein each of said nodes comprises a switch and a central processing unit, wherein a computer board on which said each of said nodes is on comprises:

leapfrog data communication paths in X, Y, and Z dimensions, each of said leapfrog paths including first and second ends and bypassing said each of said nodes;

minus data communication paths in said X, Y, and Z dimensions, each of said minus paths including a first end coupled to said switch and a second end; and plus data communication paths in said X, Y, and Z dimensions, each of said plus paths including a first end coupled to said switch and a second end.

22. The multiprocessor computing system of claim 21, wherein said switch comprises:

means for receiving data from said minus and plus paths;

means for determining destinations of said data;

means for routing said data to said central processing unit when said destinations identify said central processing unit; and means for sending said data to nodes identified by said destinations via said minus and plus paths when said destinations identify nodes other than one containing said central processing unit.

\* \* \* \* \*